United States Patent Office 3,464,827
Patented Sept. 2, 1969

3,464,827
PROCESS OF PREPARING PUFFED CEREAL PRODUCT
Takuzo Tsuchiya and Harold V. Perttula, Minneapolis, Minn., assignors to General Mills, Inc., a corporation of Delaware
No Drawing. Filed Jan. 10, 1966, Ser. No. 519,453
Int. Cl. A23l 1/18
U.S. Cl. 99—82                              13 Claims

ABSTRACT OF THE DISCLOSURE

Preparing edible cereal products by coating cereal pullets with monoglycerides or alkali metal salts of saturated fatty acids of about 14 to 22 carbon atoms and puffing said pellets by sudden release from a confined area to an area of larger volume and lower pressure.

---

The present invention relates to a process of preparing a puffed cereal product. More particularly, it relates to such a process wherein a puffed cereal product is prepared from a dough derived from a substantial proportion of dried corn particles.

Puffed cereal products of the ready-to-eat breakfast food type have long been available to the consuming public. Such products are generally prepared by puffing whole cereal grains or by puffing pieces or pellets of cooked doughs prepared from various farinaceous materials. Products prepared from corn based doughs fall into this latter category and have been available to the consuming public for a substantial number of years.

The preparation of puffed ready-to-eat cereals from corn based doughs has presented various problems. Generally, the products are prepared by adding water to a farinaceous material containing a substantial proportion of dried corn particles, (i.e. corn meal, corn flour, corn cones) cooking the dough, forming the cooked dough into pellets, drying the pellets to a moisture content suitable for puffing, puffing the dried pellets in a puffing gun and then, if desired, further drying the expanded pellets. One such process for preparing puffed, corn based cereal products is that disclosed in Collatz Patent 2,162,376. While the described process appears to be straight-forward and trouble free, sticking and/or clustering of the dough pellets is often encountered. Sticking refers to tendencies of the extruded pellets to adhere to other pellets during drying, of the dried pellets to adhere to other dried pellets during holding or storage intervals and of the dried pellets to stick to equipment and especially to the walls of the puffing gun. Another interrelated sticking problem is that of clustering. The puffed cereal leaves the puffing chamber in clumps or clusters in which two or more individual pieces are clumped or clustered into a larger unit. These clumps tend to remain intact and are not easily reduced to discrete units without considerable effort or without causing breakage of the individual puffed cereal pieces.

Methods have been devised for controlling the severity of the described sticking problem (including clustering) encountered in the production of cereal products from corn based cereal doughs. One such method involves chilling of the pellets prior to the puffing thereof. While such an operation does somewhat reduce the sticking and clustering tendencies of the pellets, it is costly. Thus additional equipment is required, including storage facilities, where the pellets must be held for the time necessary to chill same to the desired degree. A second method is to coat the dried pellets with an edible oil. Such method does substantially reduce the clustering and sticking problems above mentioned. However, the oil coated pellets cannot be successfully puffed in some puffing guns since the same employ added superheated steam which washes the oil from the pellets and causes the gun to become substantially non-operable in a short period of time due to a build-up of pellets as a result of sticking of the pellets to the walls of the gun. Still further, coating of the pellets with an edible oil has a tendency to yield a product having potential shelf-life problems due to the possibility of the oil developing a rancid flavor and the product developing a greasy surface appearance.

More recently, it has been proposed to overcome the sticking and clustering problem of cooked corn based doughs by incorporating a monoglyceride of a saturated fatty acid of about 14 to 22 carbon atoms or an alkali metal salt of such fatty acids in the dough. This procedure does substantially reduce or eliminate the sticking and clustering problems. And the resulting puffed products have good volume and flavor. However, the color of the puffed products is uneven and rather pale. Thus the products have areas which are a pale tan color and other areas which are more brown. Accordingly, the products have an overall blotchy appearance. In addition, when the dry ingredients used to make the dough include a large proportion, such as 75% by weight, of the dried corn particles, the monoglycerides or salts must be used in amounts of about 1.0 to 2.0% by weight to give optimum results. The resulting puffed products are thus flavored considerably by the monoglyceride and the salt and such flavor differs from the puffed, oil coated pellets. Still further, the internal addition of the monoglycerides or salts tends to yield a dough which is somewhat stiff and thus increased energy is required to extrude or form pellets therefrom. It would be highly desirable to provide a method of puffing corn based doughs without having to include in the dough formulation the described monoglycerides or salts and without having to either chill or oil coat the pellets.

It is, accordingly, an object of the present invention to provide a novel method of preparing a puffed cereal product. Another object is to provide such a method for preparing a puffed cereal product from a corn based dough formulation. These and other objects will become apparent from the following detailed description.

We have now discovered that puffed cereals can be prepared from corn based dough formulations without encountering, or with a substantial reduction in, the sticking and/or clustering of the pellets if the said pellets are dusted or coated with a small amount of a monoglyceride of a saturated fatty acid of about 14 to 22 carbon atoms or an alkali metal salt of such saturated fatty acids. The process of our invention generally comprises the steps of forming a dough from water and dry dough forming ingredients containing a substantial amount of dried corn particles, cooking the dough, forming pellets from the cooked dough, drying the pellets to a moisture content suitable for puffing, at least partially coating the pellets either before, during or after the drying thereof with a small amount of the monoglyceride, salt or mixtures thereof, and puffing the dried pellets. If desired, the puffed pellets can be further dried.

As indicated, the dry dough forming ingredients used to make the dough contain a substantial proportion of dried corn particles. Our invention has particular application to doughs prepared from dry ingredients which consist of at least about 10% by weight on a dry basis of the dried corn particles—i.e. corn mean, flour, cones. The invention is especially valuable for the production of puffed cereal products from dry ingredients which consist of 50 to 100% by weight of the dried corn particles. Other farinaceous materials can also be included. Representative of these materials are cereal flours or starches such as those of wheat (hard or soft), rice, tapioca, buckwheat, arrowroot, potato, oat, barley, rye, etc. Other materials can also be included such as salt, sugar, cocoa, malt, honey, dried milk, nonfat milk solids, vegetable or animal oils or fats, yeast, antioxidants, vitamins, minerals and the like. Various other flavorants and colorants (dyes) etc. can be added.

The dry ingredients are formed into a dough with water and the dough is cooked to gelatinize the starch in the farinaceous materials. Any method of cooking may be employed, but usually it is desirable to mix the dough in a jacketed mixer and cook the dough therein until the same has asquired the proper degree of gelatinization for the production of a desirable puffed product. The particular time of cooking depends somewhat upon the formulation being treated, the temperature employed, and the type of equipment used. In general, cooking of from ½ to 2 hours under atmospheric pressure in a jacketed vessel heated with steam at 5–20 pounds per square inch has been found satisfactory. Commercial equipment to perform the cooking operation under these conditions is readily avialable. Of course, the cooking can be carried out under pressure and at various temperatures and for various periods other than those specified above. Considerable variation is also possible in the quantity of water employed during the cooking operation. The minimum quantity of water which may be employed is that which will actually form a dough. Usually at east about 20–45% of moisture based on the weight of the dough is present at the time of cooking. Larger quantities of moisture may be employed. But since this moisture must be removed prior to puffing, the use of excess moisture is not desirable. Ordinarily a moisture content within the range of about 20–40% by weight of the dough has been found desirable.

After the dough has been cooked, it is shaped into any desired form of pellets for puffing. For the preparation of small pellets, the dough may be extruded in a wide variety of equipment and the extruded material cut off in the form of small pellets. The size and shape of the material formed from the dough depends upon the nature of the product desired. For ready-to-eat breakfast cereals, it is usually desirable to form the dough into small pellets which will puff into the size of pieces conventionally employed for ready-to-eat breakfast cereals. Doughs having the moisture content previously described usually can be shaped without any adjustment of the moisture content.

Prior to puffing, the dough pellets or pieces should be adjusted to a suitable puffing moisture. Such moisture content varies somewhat depending upon the specific puffing apparatus and puffing conditions employed. Thus under some puffing conditions, a moisture content as low as about 8% by weight provides suitably puffed products. Under other conditions, the moisture content of the pellets can be 16% by weight and higher and yet yield suitably puffed products. A moisture content within the approximate range of 10 to 16% by weight is preferred. Under many conditions, pellets having a moisture content of 13 to 15% by weight provide optimum results. The precise moisture content also depends to some extent upon the nature of the dough formulation and accordingly, the optimum moisture content can readily be determined for any given material. Any method of drying can be used to reduce the moisture content of the pellets. Various commercially available equipment can be used for the drying opeartion—i.e. rotary bed, drum, tray, belt driers. The pellets can also be further shaped during the drying thereof or after they have reached the desired moisture content. For example, they can be flattened somewhat by passage through cracking rolls.

According to our invention, the pellets are at least partially coated with a solid monoglyceride or salt. Monoglycerides of saturated fatty acids of about 14 to 22 carbon atoms are commercially available materials and can be prepared by well known procedures. One such method is by direct esterification of the saturated fatty acids with glycerine, followed by distillation to obtain a high purity monoglycerides mixture. Another method is by glycerolysis of saturated vegetable and animal oils. A preferred monoglyceride is Myvaplex Type 601 (also sold under the trade name Myverol Type 18–07). Such product is commercially available and is an edible, chemically saturated monoglyceride composition prepared by interesterification and distillation from glycerine and completely hydrogenated cotton-seed oil. This product comprises a mixture of monoglycerides at a concentration of at least 90 weight percent in which the stearic acid and palmitic acid moieties predominate. The monoglycerides which are employed in this invention have a purity of at least about 85% by weight. Thus some di- and triglyceride materials can be tolerated.

The alkali metal salts of the saturated fatty acids of about 14 to 22 carbon atoms can also be prepared by well known procedures and many of the same are commercially available. Such soaps or salts can be prepared, for example, by the reaction of the alkali metal hydroxide with the free fatty acid. A preferred salt is sodium stearate.

The described monoglycerides or salts are preferably used according to our invention in finely divided form. The pellets can be at leas partially coated or enrobed by the monoglycerides or salts by one preferred method by simply adding the same in finely divided form to the pellets as the latter are being tumbled or agitated. The monoglycerides or salts can be added to the pellets immediately after the formation thereof, during the drying of the pellets or after the same have been dried to the moisture content desired for puffing. Preferably the addition is effected at the point where the pellets have just about reached the desired moisture content for puffing or have reached the said moisture content. It is also preferred that the dusting or coating operation be carried out while the pellets are maintained at an elevated temperature, such as from about 100° to 200° F. The agitation or tumbling of the pellets is desired to obtain a more even distribution of the finely divided monoglycerides or salts on the pellets. Of course such even distribution could be effected in other ways. Thus the monoglycerides or salts can be melted or dissolved in a suitable solvent or emulsified and sprayed onto the pellets, for example, preferably while the same are being agitated or tumbled.

The monoglycerides or salts are employed in an amount sufficient to substantially reduce sticking (including clustering) of the pellets formed from the cooked corn based doughs. The amount of monoglycerides or salts employed will vary somewhat depending on the precise formulation being cooked, extruded, dried and puffed. Thus when the dry ingredients include a large proportion, such as 75% by weight, of the dried corn particles, amounts of about .25 to 2.0% by weight of the monoglycerides or salts based on the weight of the pellets having a moisture content suitable for puffing have been found to give good results. At other levels of dried corn particles, other amounts of the monoglycerides or salts would likely be optimum. Thus the amount to be employed is that which substantially reduces, and in many cases eliminates, sticking (including clustering) of the pellets. Mixtures of various monoglycerides or various salts can be employed as well as mixtures of the monoglycerides and the salts.

After the pellets have been dried and coated as described, they are placed in a gun puffing apparatus of any suitable type such as a batch gun puffer of the barrel type. The pellets can also be preheated to temperatures of the order of 100 to 200° F. prior to being placed in the puffing gun. The dried dough pellets can be expanded into a vacuum or into atmospheric pressure. Thus, the pellets are puffed by sudden release from a confined area into an area having a larger volume and lower pressure. One method of puffing the pellets is to place same in the puffing gun which is heated to the designated temperature, allow the steam pressure to develop by driving moisture from the pellets and then suddenly release the pellets to the atmosphere. Internally developed steam pressures which are particularly useful are 50 to 150 p.s.i. The temperatures in such batch puffing apparatus will vary more or less with the pressure obtained. Temperatures of 400 to 650° F. have been found to give good results. The optimum pressure and temperature varies somewhat depending upon the specific dough formulation. Pressures of 80 to 120 p.s.i. and temperatures of 425 to 625° F. are especially preferred.

An especially important feature of this invention is that the at least partially coated pellets can be gun puffed under conditions where steam is added to the puffing gun chamber. One particularly preferred method of puffing using added steam is that disclosed and claimed in Takuzo Tsuchiya, George Long and Kenneth Hreha application Ser. No. 56,046, filed Sept. 14, 1960, and entitled "Methods and Apparatus for Continuous Puffing," now Patent No. 3,231,387 which disclosure is incorporated herein by reference. In brief, said process involves continuously feeding the pellets into a pressurized processing zone into which at least one gaseous processing fluid is introduced at a location providing immediate contact with the pellets which enter the zone, maintaining the processing fluid in a turbulent condition at the location of initial contact to increase its effective initial action on the pellets, and puffing the pellets by continuously discharging both the fluid and the pellets into a region of substantially lower pressure than the pressure within the processing zone. Superheated steam is the preferred fluid for use in the process since it especially promotes the more rapid initial transfer of heat from the fluid to the colder pellets entering the processing zone.

After the described puffing operation, the puffed pellets may be further dried by conventional methods if desired. The pellets immediately after puffing normally have a moisture content of about 6–8%. It may be desirable to dry the product down to a moisture content in the range of about 2.5 to 4.0% to increase the stability and shelf life thereof. This, however, is unnecessary where the product is to be consumed in a short period of time and the shelf life and long term stability are not needed.

In order to further illustrate various features of the present invention and preferred embodiments thereof, the following examples are included. Unless otherwise indicated, all parts and percentages used herein are by weight.

EXAMPLE I

A dough was made up of the following ingredients in the following proportions by weight:

| | Parts |
|---|---|
| Yellow corn cones | 76.0 |
| Oat flour | 10.0 |
| Sugar (sucrose) | 5.8 |
| Wheat starch | 5.1 |
| Salt (NaCl) | 2.74 |
| Vitamin concentrate (iron, niacin, wheat starch carrier) | .026 |

Water was added to the above ingredients to provide an admixture having a moisture content of 38–40% by weight and the same was charged to a steam jacketed mixer-cooker (James Cooker). The dough was cooked at 212° F. for about 45 minutes at atmospheric pressure. The cooked dough was then extruded through a die and cut into round pellets having a diameter of about ⅛ inch. The moisture content of the extruded pellets was about 24–25% by weight. The pellets were dried to a moisture content of about 22% by weight in a rotary bed drier (Huhn) and then to about 14–15% by weight in a belt dried (Proctor) at a temperature of about 142° F. The pellets were flattened slightly by passage through cracking rolls and were then dusted with about 0.5% by weight of Myvaplex Type 601 monoglycerides. They were immediately placed in a second rotary bed drier (Huhn) where the pellets were tumbled and dried at a temperature of 150–155° F. to a moisture content of 13–14% by weight. The pellets leaving the drier were fairly uniformly coated with the monoglycerides. The pellets were then heated to a temperature of 184° F. and fed continuously into the gun puffing apparatus described in the aforementioned application of Tsuchiya, Long and Hreha. The feed rate was 20 lbs./minute. The following gun conditions were employed:

| | |
|---|---|
| 1st zone temp. (° F.) | 810. |
| 2nd zone temp. (° F.) | 790. |
| 3rd zone temp. (° F.) | 685. |
| Angle of barrel below horizontal (°) | 3. |
| Barrel rotation (r.p.m.) | 70. |
| Puffing nozzle orifice (diam.) | 17/32 inch. |
| Barrel size (diam. x length) | 8 inch x 18 feet. |
| Barrel pressure | 100–104. |

Superheated steam at a temperature of 396° F. was introduced into the gun at a flow rate of 1500 lbs./hr. and a pressure of 100–104 p.s.i. The pellets were continuously ejected to the atmosphere to yield puffed pellets having about 7 times the size of the unpuffed pellets. The pellets had good flavor and a fairly uniform tan color. No clustering of the pellets was noted and the same did not stick to the walls of the puffing gun. In contrast, uncoated pellets stuck in the barrel and caused the gun to choke almost immediately. This was also found to be true for pellets coated with 2% by weight of coconut oil. The oil was washed off the pellets by the superheated steam causing the gun to choke and cease operation.

EXAMPLE 2

Example 1 was essentially repeated using a coating of 2% by weight of the monoglycerides. The continuous puffing gun operated smoothly and the puffed pellets had the same good volume and color as the pellets of Example 1. However, the flavor was not as desirable due to the increased amount of monoglycerides.

EXAMPLE 3

Example 1 was essentially repeated except that the amount of monoglycerides was reduced to 0.4% by weight. The same excellent results were achieved as in Example 1. After several hours of operation, the amount of monoglycerides added to the continuous stream of pellets being processed was reduced to 0.3% by weight with no apparent problem. No sticking or clustering of the pellets was noted even at this low percent monoglycerides addition.

EXAMPLE 4

Dried and coated pellets as prepared in Example 1 are placed in a batch gun puffer and puffed at 80–120 lbs. internal steam pressure and at temperatures of 450° to 550° F. The residence times in the gun are varied from about 4–6 minutes. The pellets puff without sticking or clustering and have the same fine properties as those of Example 1.

The foregoing examples have been included to illustrate various preferred embodiments of the invention and are not to be interpreted as limitations on the scope thereof. Many modifications will be apparent to those skilled in the art.

The embodiments of the present invention in which an exclusive property or privilege is claimed are defined as follows:

1. In a process of producing an edible cereal product wherein a dough is formed from water and dry dough forming ingredients consisting of at least 10% by weight dried corn particles, the dough is cooked, pellets are formed from the cooked dough and dried to a moisture content suitable for puffing and the dried pellets are puffed by sudden release from a confined area to which steam is added to an area of larger volume and lower pressure, the improvement comprising at least partially coating the pellets at a point prior to the puffing thereof with a material selected from monoglycerides or alkali metal salts of saturated fatty acids of about 14 to 22 carbon atoms in an amount sufficient to substantially reduce sticking of the pellets.

2. The process of claim 1 wherein the material is a monoglyceride.

3. The process of claim 1 wherein the material is a monoglyceride derived from hydrogenated cottonseed oil.

4. The process of claim 1 wherein the material is sodium stearate.

5. The process of claim 1 wherein the material is used in an amount of about .25 to 2.0% by weight based on the weight of the pellets immediately prior to being puffed.

6. The process of claim 1 wherein the dry dough forming ingredients consist of 50 to 100% by weight of the dried corn particles.

7. The process of claim 1 wherein the dry dough forming ingredients also comprise at least one additional farinaceous material and flavoring and coloring agents.

8. The process of claim 1 wherein the dry dough forming ingredients also comprise oat flour, salt, sugar and wheat starch.

9. The process of claim 1 wherein the pellets are dried to a moisture content of about 10 to 16% by weight prior to the puffing thereof.

10. The process of claim 1 wherein the puffed pellets are further dried to a moisture content of less than about 4% by weight.

11. The process of claim 1 wherein the at least partially coated pellets are continuously fed into a pressurized processing zone into which superheated steam is introduced at a location providing immediate contact with the pellets entering the zone, the superheated steam is maintained in a turbulent condition at the location of initial contact with the pellets and the pellets are puffed by continuously discharging both the pellets and the superheated steam into the area of larger volume and lower pressure.

12. In a process of producing an edible cereal product wherein a dough is formed from water and dry dough forming ingredients consisting of at least 10% by weight dried corn particles, the dough is cooked, pellets are formed from the cooked dough and dried to a moisture content suitable for puffing and the dried pellets are puffed by sudden release from a confined area to an area of larger volume and lower pressure, the improvement comprising at least partially coating the pellets at a point prior to the puffing thereof with an alkali metal salt of a saturated fatty acid of about 14 to 22 carbon atoms in an amount sufficient to substantially reduce sticking of the pellets.

13. The process of claim 12 wherein the salt is sodium stearate.

References Cited
UNITED STATES PATENTS

| | | | |
|---|---|---|---|
| 3,113,869 | 12/1963 | Lee | 99—85 |
| 3,246,990 | 4/1966 | Thompson et al. | 99—82 |
| 2,898,215 | 8/1959 | Ferrel | 99—80 XR |

RAYMOND N. JONES, Primary Examiner

J. R. HOFFMAN, Assistant Examiner